(12) United States Patent
Mishra et al.

(10) Patent No.: US 10,146,316 B2
(45) Date of Patent: Dec. 4, 2018

(54) METHOD AND APPARATUS FOR DISAMBIGUATING A PLURALITY OF TARGETS

(71) Applicant: Nokia Corporation, Espoo (FI)

(72) Inventors: Pranav Mishra, Bangalore (IN); Rajeswari Kannan, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 522 days.

(21) Appl. No.: 14/439,714

(22) PCT Filed: Nov. 2, 2012

(86) PCT No.: PCT/IN2012/000722
§ 371 (c)(1),
(2) Date: Apr. 30, 2015

(87) PCT Pub. No.: WO2014/068582
PCT Pub. Date: May 8, 2014

(65) Prior Publication Data
US 2015/0293597 A1  Oct. 15, 2015

(30) Foreign Application Priority Data

Oct. 31, 2012  (IN) .......................... 4544/CHE/2012

(51) Int. Cl.
*G06F 3/01* (2006.01)
*G06F 3/0484* (2013.01)
(Continued)

(52) U.S. Cl.
CPC .............. *G06F 3/017* (2013.01); *G06F 1/163* (2013.01); *G06F 3/011* (2013.01); *G06F 3/013* (2013.01);
(Continued)

(58) Field of Classification Search
CPC ... G06F 1/163; G06F 2203/0381; G06F 3/011
See application file for complete search history.

(56) References Cited

U.S. PATENT DOCUMENTS

| 6,111,580 A | 8/2000 | Kazama et al. .............. 345/358 |
| 2010/0231418 A1* | 9/2010 | Whitlow ................ G01C 23/00 340/945 |

(Continued)

FOREIGN PATENT DOCUMENTS

| WO | WO 2010/127714 A2 | 11/2010 |
| WO | WO 2012/107892 A2 | 8/2012 |

OTHER PUBLICATIONS

Rachovides, Dorothy, et al., "The Conductor Interaction Method", © 2007 ACM, ACM Transactions on Multimedia Computing, Communications, and Applications, vol. 3, No. 4, December 2007, 23 pgs.

*Primary Examiner* — Chun-Nan Lin
(74) *Attorney, Agent, or Firm* — Harrington & Smith

(57) ABSTRACT

A method includes, in response to a detected gesture user input, wherein the gesture user input is ambiguous as to which one of a plurality of putative targets the gesture user input is directed, disambiguating the plurality of putative targets using disambiguating data to enable selection of one of the plurality of targets; and performing, in response to the gesture user input, a user input command associated with the selected target.

13 Claims, 6 Drawing Sheets

Figure 1:
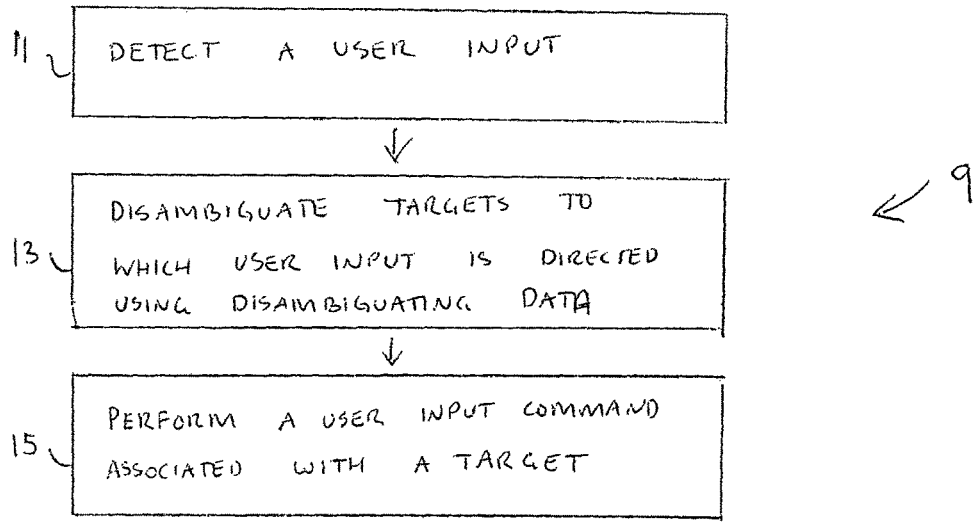

(51) Int. Cl.
*G06F 1/16* (2006.01)
*G06F 3/03* (2006.01)
*G06F 3/038* (2013.01)

(52) U.S. Cl.
CPC ............ *G06F 3/0304* (2013.01); *G06F 3/038* (2013.01); *G06F 3/04842* (2013.01); *G06F 2203/0381* (2013.01)

(56) References Cited

U.S. PATENT DOCUMENTS

2012/0257035 A1* 10/2012 Larsen .................... G06F 3/017
348/78
2012/0304061 A1* 11/2012 Hoover ............... G06F 3/04842
715/711

* cited by examiner

METHOD AND APPARATUS FOR DISAMBIGUATING A PLURALITY OF TARGETS

TECHNOLOGICAL FIELD

Embodiments of the present disclosure relate to a method, an apparatus and/or a computer program for enabling a user input command to be performed.

BACKGROUND

A man-machine interface (MMI) is often provided in electronic apparatus so that a user can control the apparatus using user input commands by interacting with the MMI.

Typically there is a one-to-one correspondence between a particular type of interaction and a particular user input command. For example, in a graphical user interface (GUI), selecting an icon may execute a function associated with that icon.

BRIEF SUMMARY

According to some, but not necessarily all, embodiments of the disclosure there may be a method comprising: in response to a detected gesture user input, wherein the gesture user input is ambiguous as to which one of a plurality of putative targets the gesture user input is directed, disambiguating the plurality of putative targets using disambiguating data to enable selection of one of the plurality of targets; and performing, in response to the gesture user input, a user input command associated with the selected target.

According to some, but not necessarily all, embodiments of the disclosure there may be an apparatus comprising: a processor; and a memory including computer program code; wherein the memory and the computer program code are configured to, with the processor, enable the apparatus to: in response to a detected gesture user input, wherein the gesture user input is ambiguous as to which one of a plurality of putative targets the gesture user input is directed, disambiguate the plurality of putative targets using disambiguating data to enable performance of a user input command associated with a selected one of the plurality of targets.

According to some, but not necessarily all, embodiments of the disclosure there may be a computer program comprising computer program instructions that, when executed by a processor, enable an apparatus at least to perform: in response to a detected gesture user input, wherein the gesture user input is ambiguous as to which one of a plurality of putative targets the gesture user input is directed, disambiguating the plurality of putative targets using disambiguating data to enable selection of one of the plurality of targets to enable performance of a user input command associated with the selected target.

According to some, but not necessarily all, embodiments of the disclosure there may be an apparatus comprising: means for detecting a gesture user input, wherein the gesture user input is ambiguous as to which one of a plurality of putative targets the gesture user input is directed; means for disambiguating the plurality of putative targets using disambiguating data to enable selection of one of the plurality of targets; and means for performing, in response to the gesture user input, a user input command associated with the selected target.

According to some, but not necessarily all, embodiments of the disclosure there may be a method comprising: in response to a detected user input, wherein the user input is ambiguous as to which one of a plurality of putative targets the user input is directed, disambiguating the plurality of putative targets using real-time disambiguating data to enable selection of one of the plurality of targets; and performing, in response to the gesture user input, a user input command associated with the selected target.

According to some, but not necessarily all, embodiments of the disclosure there may be a method comprising: in response to a detected gesture user input, wherein the gesture user input is ambiguous as to which one of a plurality of putative outcomes is commanded, disambiguating the plurality of putative outcomes using disambiguating data to enable selection of one of the plurality of putative outcomes; and performing, in response to the gesture user input, a user input command associated with the selected outcome.

BRIEF DESCRIPTION

Figure 2:
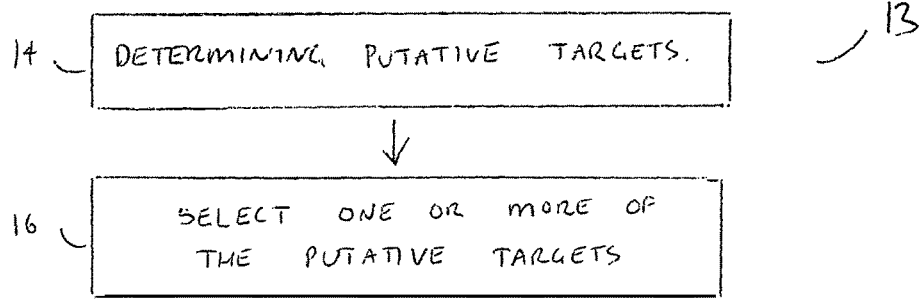
Figure 3:
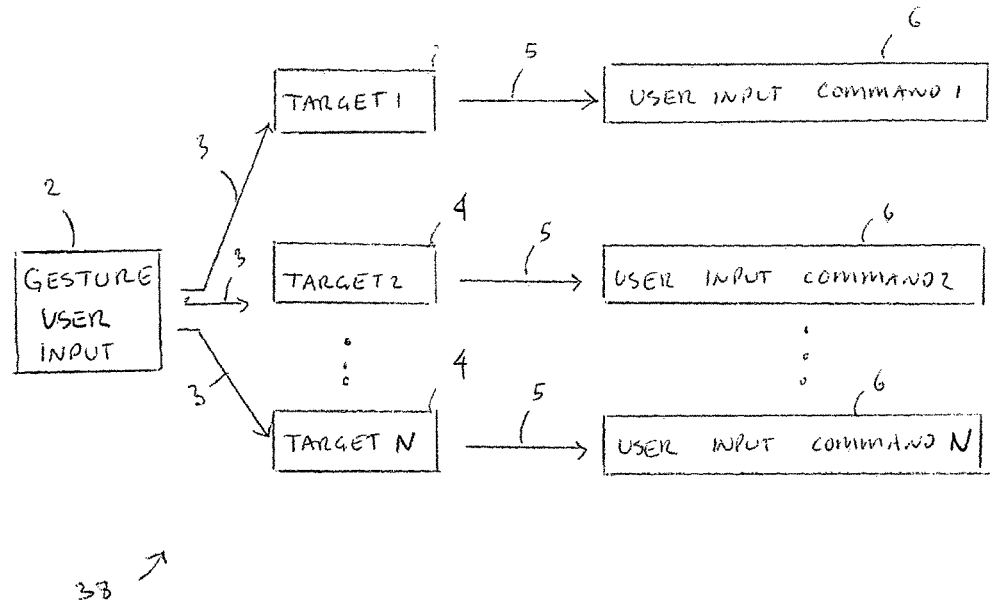
Figure 4:
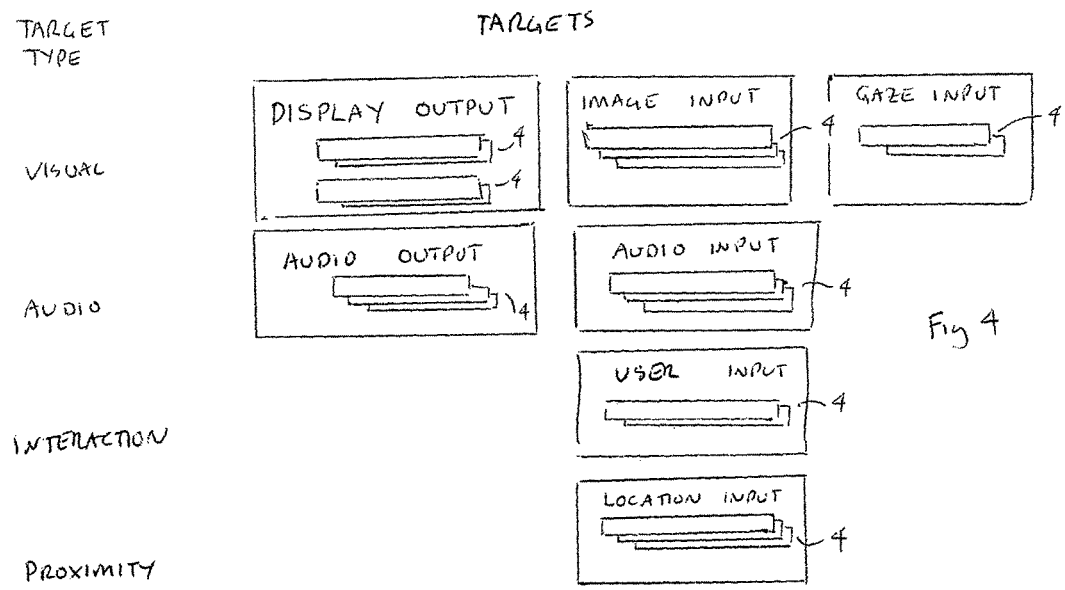
Figure 5:
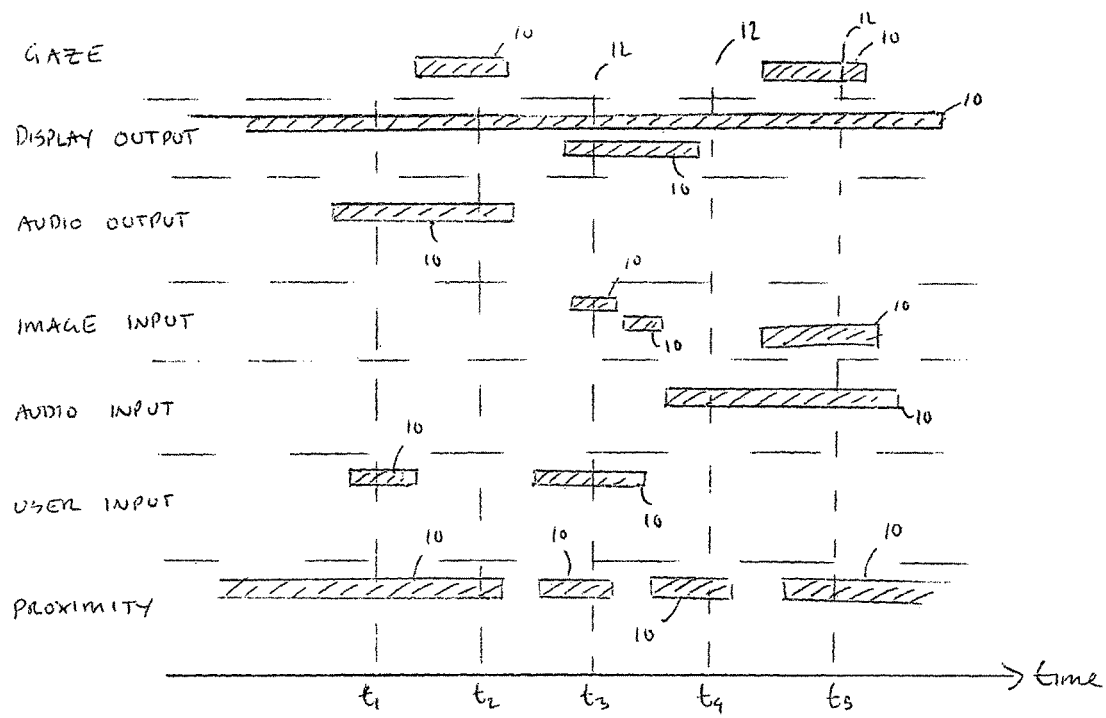
Figure 6:
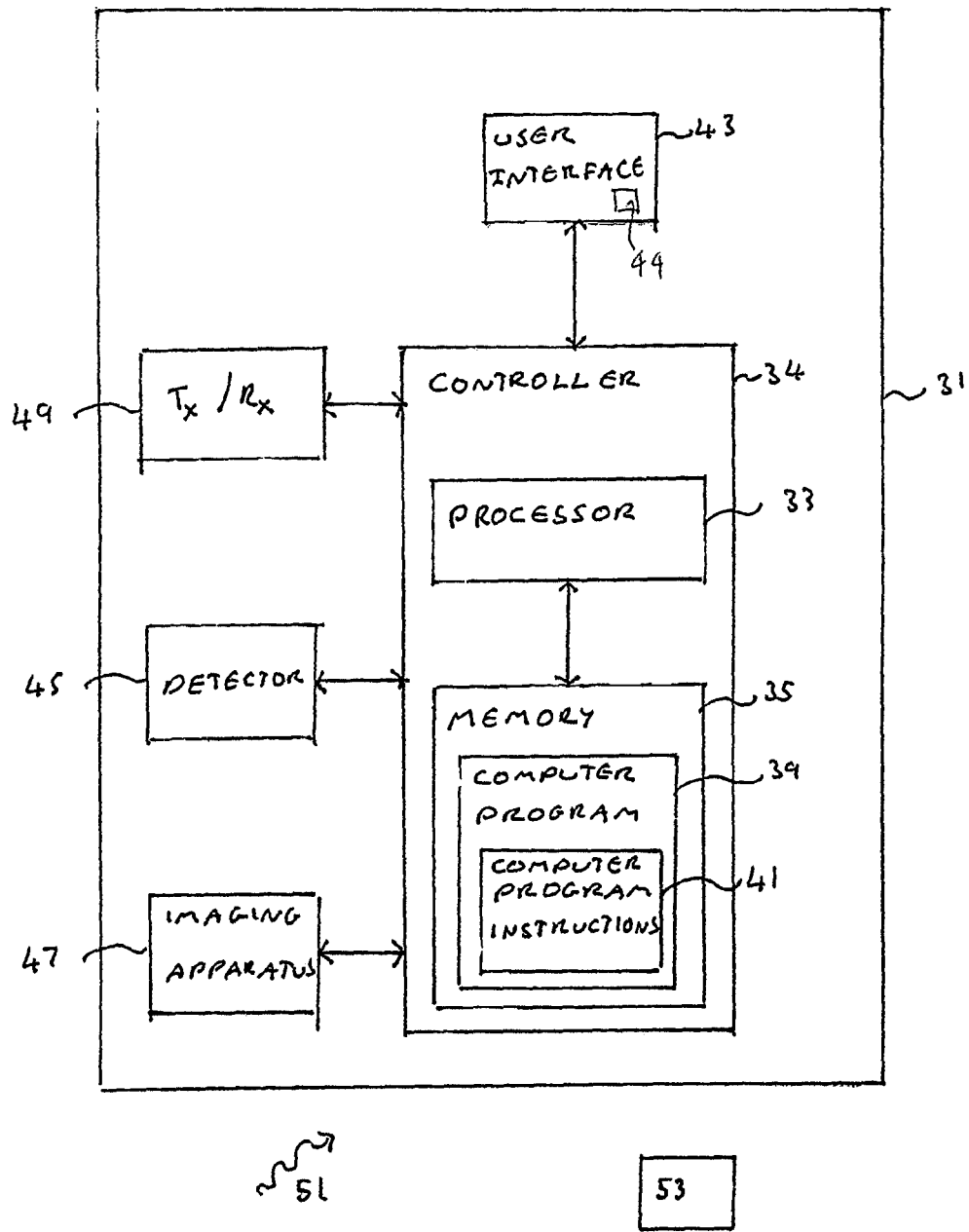
Figure 7:
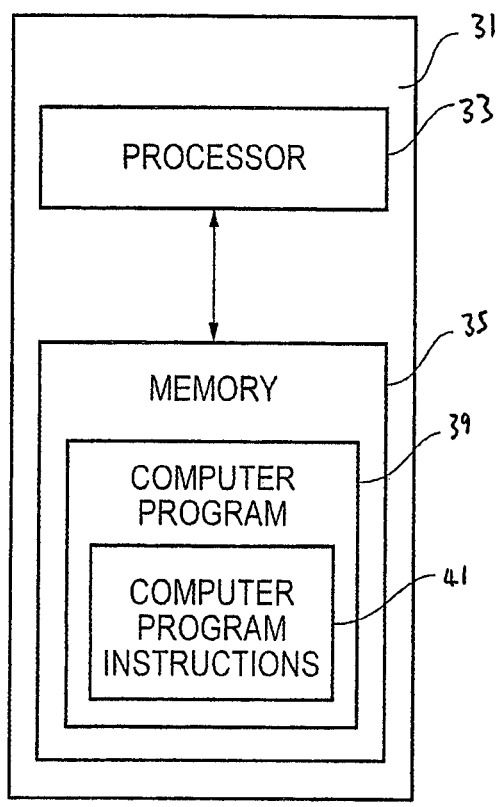
Figure 8:
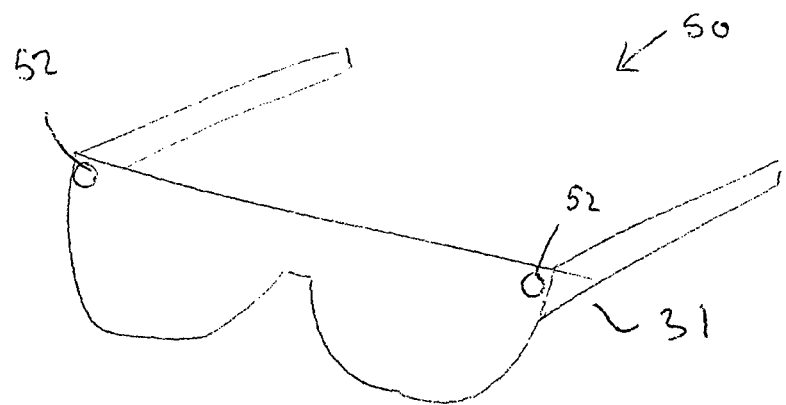
Figure 9:
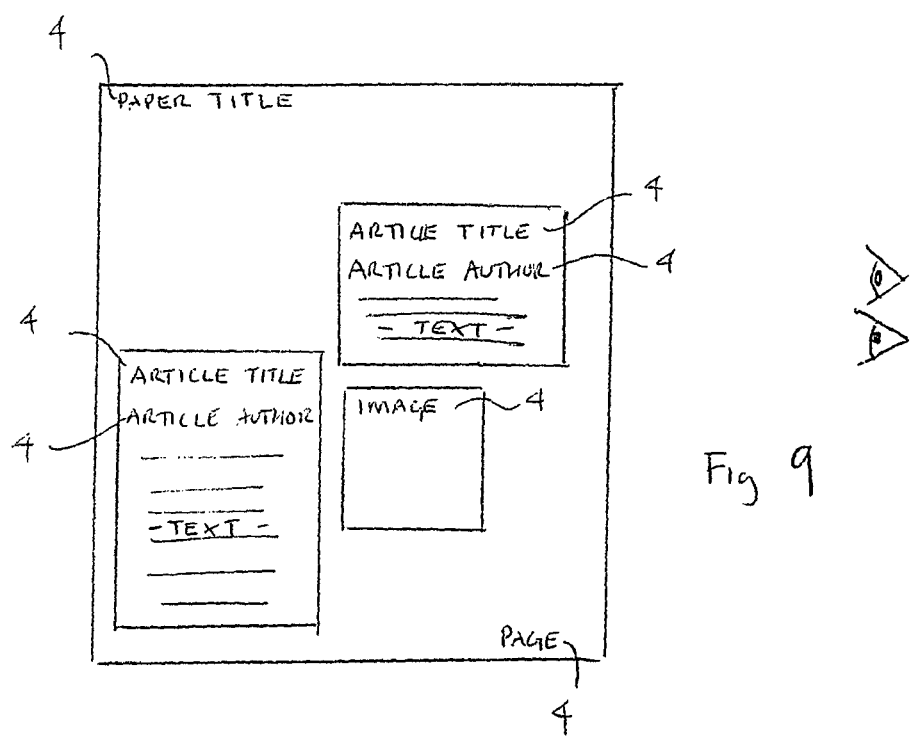

For a better understanding of various examples of embodiments of the present disclosure, reference will how be made by way of example only to the accompanying drawings in which:

FIG. 1 illustrates an example method;
FIG. 2 illustrates an example method;
FIG. 3 illustrates an example of ambiguity in that the same gesture user input is associated with a plurality of putative targets, which are in turn associated with user input commands performable in response to the gesture user input;
FIG. 4 illustrates some examples of targets;
FIG. 5 illustrates some examples of disambiguating data;
FIG. 6 illustrates an example apparatus;
FIG. 7 illustrates an example apparatus;
FIG. 8 illustrates an example apparatus which is wearable by a user as a headset; and
FIG. 9 illustrates an example application of the method.

DETAILED DESCRIPTION

In the following description, reference will be made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples.

Thus 'example', 'for example' or 'may' refers to a particular instance in a class of examples. A property of the instance can be a property of only that instance or a property of the class or a property of a sub-class of the class that includes some but not all of the instances in the class.

The Figures illustrate an example method 9 comprising: in response to a detected gesture user input 2, wherein the gesture user input 2 is ambiguous as to which one of a plurality of targets 4 (putative targets) the gesture user input is directed, disambiguating the plurality of targets 4 using disambiguating data 8 to enable selection of one of the plurality of targets 4 to enable performance of a user input command 6 associated with the selected target.

Selection of one of the plurality of targets 4 may occur by selection of only one of the plurality of targets 4 or by selection of more than one of the plurality of targets 4.

The method 9 may be implemented using an apparatus 31 such as, for example, the user apparatus 31 illustrated in FIG. 6 or 7 and/or as described below.

In a situation where a gesture user input 2 is performed and detected, it may be ambiguous as to which one of a plurality of putative targets 4 the gesture user input 2 is directed.

Gesture

A gesture user input 2 is a gesture that has meaning to an apparatus 31 as a user input. A gesture may be static or moving.

A moving gesture may comprise a predetermined movement or a predetermined movement pattern comprising a series of movements. For example it could be making a circling motion or a side to side or up and down motion or the tracing of a sign in space.

A moving gesture may, for example, be an apparatus-independent gesture or an apparatus-dependent gesture.

An apparatus-independent gesture is decoupled from the user apparatus 31 and involves movement of a user input object e.g. a user body part or parts, or a further apparatus, relative to the user apparatus 31. The movement may be three dimensional, for example, through a space external to the apparatus 31. The body part may comprise the user's hand or part of the user's hand such as one or more fingers and thumbs. In other examples, the user input object may comprise a different part of the body of the user such as their head. An apparatus-dependent gesture involves movement of a user apparatus 31 through space. The movement may be three dimensional.

Three-dimensional movement may comprise motion of the user input object in any three orthogonal directions. The motion may comprise the user input object moving towards or away from an apparatus 31 as well as moving in a plane parallel to the apparatus 31 or any combination of such motion.

A gesture may be a non-contact gesture. A non-contact gesture does not contact the apparatus 31 at any time during the gesture.

A gesture may be an absolute gesture that is defined in terms of an absolute displacement from the user apparatus 31. Such a gesture may be tethered, in that it is performed at a precise location relative to the apparatus 31. Alternatively a gesture may be a relative gesture that is defined in terms of relative displacement during the gesture. Such a gesture may be un-tethered, in that it need not be performed at a precise location relative to the apparatus 31 and may be performed at a large number of arbitrary locations.

A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture may be performed in one dimension (1D gesture), two-dimensions (2D gesture) or three dimensions (3D gesture).

Any suitable gesture detector 44 may be used to detect a gesture. Examples of suitable detectors include a proximity detector, a touch detector, one or more cameras, for example, stereoscopic cameras, accelerometers, strain gauges or any other suitable means.

The gesture detector 44 may be worn. It may, for example, be part of a headset apparatus 31.

Many different gestures are possible as gesture user inputs. In some but not necessarily all examples, the gesture may have a recognised meaning which may be used to communicate to other people. For example, the user may make a thumbs-up gesture or an 'OK' gesture to indicate they like something or a thumbs-down gesture to indicate they do not like something. This may make the gesture user input 2 easy for the user to remember and more intuitive to implement and re-use in different contexts to have different outcomes.

For example, the 'thumbs-up' gesture is performed by making the fingers of a hand into a fist shape with the thumb of the hand pointing straight up and substantially orthogonal to the fingers and forearm, with or without movement in the direction the thumb is pointing. The 'OK' gesture is performed by making a hand into a flat palm with fingers extended, except for the first finger and thumb which are bent to touch and form an 'O'.

Ambiguity

As an example, the gesture user input 2 may be ambiguous as to outcome. As an example, the gesture user input 2 may be ambiguous as to which one of a plurality of putative targets 4 the gesture user input 2 is directed. This is because a single gesture user input 2 may be a valid user input in respect of a number of different targets but it is not known, from the gesture, which of those valid putative targets 4 is the intended target 4.

FIG. 3 schematically illustrates a mapping from a gesture user input 2 to associated putative targets 4 and from the putative targets 4 to associated user input commands 6.

In this situation a single gesture user input 2 is associated as a user input command 6 for different targets 4. The gesture user input 2, when performed, is therefore ambiguous as to which one of the plurality of putative targets 4 the gesture user input 2 is directed.

The purpose of directing a gesture user input 2 to a target 4 is to perform, in response to the gesture user input 2, a user input command 6 associated with the target.

Targets

The targets 4 may be recent attention states of a user inferred from activity of the user apparatus 31 used by the user. The targets 4 may be inferred from the attention of the user.

FIG. 4 illustrates some examples of targets 4.

The example targets are grouped as visual targets, audio targets, interaction targets and proximity targets. The different groups are labelled at the left of the figure and the members of the groups are listed from left to right adjacent the respective group headings. It should be appreciated that less, more and different groups may be used. It should be appreciated that each group may have less, more and different members.

In the following, reference is made to linking objects to targets. Linking is this sense means that the object operates as a waypoint on a route for accessing the target. The route may be a single hop from object to target or it may be a series of hops from object to intermediary (or intermediaries) to target.

The targets 4 may be visual targets seen by a user. In this example, but not necessarily all examples, the targets 4 include one or more display output targets, one or more image input targets, and one or more gaze input targets.

Concerning the targets 4 as display output targets, one or more displayed (rendered) objects may be targets 4 and/or may be linked directly or indirectly to targets 4. A display output object may, for example, be a control item that performs a function e.g. an icon or a content item that provides cognitive information to a user such as an image, a web-page, an application window etc.

Concerning the targets 4 as image input targets, one or more captured image objects may be targets 4 and/or may be linked directly or indirectly to targets 4. An image object may, for example, be picture or video.

Concerning the targets 4 as gaze input targets, one or more objects viewed may be targets 4 and/or may be linked directly or indirectly to targets 4.

The targets 4 may be audio targets which may be heard by a user. In this example, but not necessarily all examples, the audio targets include one or more audio output targets and one or more audio input targets.

Concerning the targets as the audio output targets, one or more played (rendered) audio objects may be targets 4 and/or may be linked directly or indirectly to targets 4. An audio object may, for example, be a recording, a music track or similar.

Concerning the targets as the audio input targets, one or more captured audio objects may be targets 4 and/or may be linked directly or indirectly to targets 4. Audio objects may, for example, be a music track, ambient sound or other audio.

The targets 4 may be interaction targets that comprise an interaction object to which attention was given by recent user interaction. An interaction object may be a real object. An object may be a virtual object, for example, imagined by a user. In this example, but not necessarily all examples, the interaction targets include one or more user input targets.

Concerning the targets as the user input targets, one or more interaction objects interacted with via input received via the user interface 43 may be targets 4 and/or may be linked directly or indirectly to targets 4. The interaction may, for example, be prioritization, starting, ending, opening, closing, selecting, for example, files or applications.

Targets 4 may comprise an external object to which attention may have been given by recent proximity. In this example, but not necessarily all examples, the targets 4 (which may be proximity targets) include one or more location input targets.

Concerning the targets 4 as location input targets, one or more local objects may be targets 4 and/or may be linked directly or indirectly to targets 4.

Disambiguating

A disambiguation engine may be used to disambiguate the plurality of putative targets 4 using disambiguating data 8. The disambiguation engine may be provided in hardware circuitry, in software or in a combination of hardware and software. The disambiguation engine may be wholly or partly resident in the user apparatus 31. It may in some but not necessarily all examples be resident, in whole or in part, at a remote server apparatus that serves multiple users.

Disambiguating the plurality of putative targets 4 comprises removing or reducing ambiguity (uncertainty of intention) as to the user's intention as to outcome.

A gesture user input 2 may be intended for (directed to) one of many possible targets 4 (putative targets). Disambiguation comprises removing or reducing the uncertainty to enable selection of one (or more) of the plurality of putative targets. Disambiguation may produce as an output a short-list of putative targets 4 or a single putative target 4. The short-list may be ordered as to likelihood of intention such that the most likely target 4, for the user, is displayed, for example, first.

Disambiguation may include the step of determining, using the disambiguating data 8, a plurality of putative targets 4 to which the gesture user input 2 may be directed, followed by selection of one or more of the plurality of putative targets 4.

Disambiguating Data

Disambiguating data 8 is data used to disambiguate the plurality of putative targets 4 to which the gesture user input 2 is directed. It may be used to select one or more of the plurality of targets 4 as the intended target 4 or intended targets 4.

Context may enable determination of which one of many possible targets 4 a gesture user input 2 is intended for (directed to). Disambiguating data 8 may be contextual data indicating the circumstances of the user and/or user apparatus 31.

The disambiguating data 8 may comprise data that is real-time. Real-time implies that the data is current (not historic, not predictive, but substantially contemporaneous with the gesture user input 2) and dynamic (changeable). The disambiguating data 8 may consequently comprise a snap-shot of changeable circumstances at the time the gesture user input 2 is performed.

The disambiguating data 8 may comprise data that is historic.

In some but not necessarily all examples, one detector 45 or more than one detector 45 may be used to obtain some or all of the disambiguating data 8. Examples of detectors 45 may include externally directed sensors for sensing parameters such as images, audio, or location, such as, for example, microphones, cameras or positioning circuitry (e.g. cellular positioning, local network positioning or satellite positioning). A detector 45 may also comprise a software detector that detects events that occur at the user apparatus 31 such as display output, audio output, user input.

FIG. 5 illustrates the occurrence of different events 10 over time. The class of event is labelled at the left (y-axis). The time extends to the right (x-axis). Where there is not hatched shading associated with a class of event, there is no event 10 of that class at that time. Where there is hatched shading associated with a class of event, there is an event 10 of that class at that time.

It will be appreciated that over time different events 10 start and stop. It will be appreciated that the duration of events 10 is variable. It will be appreciated that different events 10 may occur with respect to an event class in parallel and/or in series.

An event state 12 of the apparatus 31 may be defined as those events 10 occurring at a particular time, it can be observed from FIG. 5 that the event state of the apparatus 31 changes in time. The event states 12 at t1, t2, t3, t4 and t5 are, for example, different. The event state 12 at time t may be indicative of the activity of the user apparatus 31 at time t and/or indicative of the attention of the user of the user apparatus 31.

In some but not necessarily all examples, the disambiguating data 8 may comprise the event state 12 of the user apparatus 31 when a gesture user input 2 is performed.

In some but not necessarily all examples, the disambiguating data 8 may also comprise event states 12 of the user apparatus 31 prior to when the gesture user input 2 is performed.

In some but not necessarily all examples, the disambiguating data 8 may also comprise event states 12 of the user apparatus 31 just after the gesture user input 2 is performed.

During disambiguation weight may be given to events 10 that are current (live) when the gesture user input 2 is performed.

During disambiguation weight may be given to events 10 that have changed status recently e.g. just finished, opened, closed, started, ended, selected.

The event classes illustrated are, in the example of FIG. 5, event classes that are useful for disambiguating between the targets 4 illustrated in FIG. 4, although other event classes may be used.

Thus, in this example, the event state 12 may comprise one or more of the following classes: display output; audio output; image input; audio input; user input event; gaze input event.

A display output event class may comprise display events 10, such as what objects are displayed as an output of the apparatus 31. The time evolution of display events 10 may be used to assess the likelihood that a displayed object is a focus of the user's attention and is an intended target 4.

An audio output event class may comprise audio output events 10, such as what audio objects are played as an output of the apparatus 31. The time evolution of audio events 10 may be used to assess the likelihood that an output audio object is a focus of the user's attention and the intended target 4.

An image input event class may comprise image input events 10, such as what image objects are captured as an input of the apparatus 31. The time evolution of image input events 10 may be used to assess the likelihood that a captured image object is a focus of the user's attention and the intended target 4.

An audio input event class may comprise audio input events 10, such as what audio objects are captured as an input of the apparatus 31. The time evolution of audio input events 10 may be used to assess the likelihood that a captured audio object is a focus of the user's attention and the intended target 4.

In some but not necessarily all examples, an audio input event 10 may relate to any external sounds, such as music or other background noises, which the user may be able to hear.

In some but not necessarily all examples, an audio input event may relate to only particular external sounds, such as music which the user may be able to hear.

A user input event class may comprise user input events 10, such as objects where user interactions occur. Interaction may, for example, involve user prioritization, opening, closing, starting, ending, selecting. The time evolution of such user input events 10 may be used to assess the likelihood that a particular object of a user input event is a focus of the user's attention and the intended target.

There is a proximity event class that comprises proximity events 10 such as location input events or proximal (local) objects. The time evolution of such proximity events 10 may be used to assess the likelihood that a particular proximal (local) object is a focus of the user's attention and the intended target.

A location input event 10 may, for example, relate to a geographical location of the user, for example, it may determine the town or street or building that the user is currently located in. The location of the user may be, for example, a commercial establishment such as a shopping mall, a restaurant or any other location. In such examples the information indicating the location of the user may be obtained using means such as GPS (global positioning system) or other suitable location determining means.

In some examples a location input event 10 may relate to relative location with respect to other objects. For example, the disambiguating data 8 may contain information that there are other apparatus 31 which are located close to the user. For example, the disambiguating data 8 may provide an indication that another apparatus 31 such as a television, or any other type of apparatus 31, is within a few meters of the user of the apparatus 31. This may be used to infer that the current activity of the user may be, for example, watching a television. In some examples the disambiguating data 8 may contain information that there are other people who are near to the user. In such examples the information relating to the other people may be obtained using facial recognition or other suitable analysis of the faces of the people nearby. In some examples the information relating to the other people may be obtained by identifying apparatus such as communications devices which may be carried by the people.

A gaze input event class may comprise objects of user gaze events 10, such as objects where the user's attention lingers. The time evolution of such user gaze events 10 may be used to assess the likelihood that a particular object is a focus of the user's attention and the intended target.

For gaze, the disambiguating data 8 may comprise eye data that records the state of the user's eyes. The state of a user's eyes may, for example, include whether they are open or shut. The state of a user's eyes may, for example, include a position of the user's eyes. The state of the user's eyes may be determined using computer vision technology to identify eye closure and/or track movement of one or both of a user's pupils.

What a user is gazing at may be inferred from the state of a user's eyes and/or the time evolution of that state.

It can be inferred, using an inference engine, from a position of the eyes and knowledge of what is in front of the eyes, from for example a captured image, what object within the captured image the user is gazing at.

It can be inferred, using an inference engine, whether the eyes are open or closed and from the position of the eyes, whether the user is attentive or non-attentive to what he is seeing.

It can be inferred, using an inference engine, how the position of the eyes changes, whether the user's gaze is fixed or moving, whether it is tracking or not and whether, if tracking, it is tracking back and forth or not, whether it is random movement; and how long a user's gaze lingers on objects.

If the user's eyes are moving this may provide an indication that they are reading whereas if their eyes are staying still it may provide an indication that the user is looking at an image. If the user's eyes are closed this may provide an indication that the user is participating in an activity which does not require them to see anything, such as listening to music or other audio.

In general, the event state 12 may comprise events 10, such as what objects are associated with an event class at that time. The time evolution of the events 10 may be used to assess the likelihood that the associated object is a focus of the user's attention and the intended target.

The audio input event class may be generalised to a sensor input event class. The sensor input event class records input received from other sensors of external events such as temperature or light levels.

Other examples of event classes may, for example, include a personal event class that relates to personal information of the user. As an example disambiguating data 8 may comprise information stored in a calendar or available in a blog or social networking application.

Other examples of event classes may, for example relate to a third party event classes for which third party events are retrieved remotely to the apparatus 31. As an example disambiguating data 8 may comprise information stored in a third party calendar, blog or social networking application. As an example disambiguating data 8 may comprise a television schedule or a list of top selling songs or other content items.

The gaze event class may be generalised to a user body event class that comprises user body events, such as gaze, posture, movement of limbs. In this example, the disambiguating data 8 may comprise information about the relative positions and/or movement of the parts of the user's body, for example, the information may provide an indication of whether the user is sitting or standing or walking.

In the examples illustrated, the disambiguating data 8 is independent of the gesture user input 2 detected at block 11 of FIG. 1. Although the disambiguating data 8 is not dependent upon the gesture itself, it may be dependent upon the timing of the gesture user input 2. In some but not necessarily all examples it may also be dependent on a position (relative or absolute) of the gesture.

Disambiguation using the disambiguating data 8 may occur in a variety of different ways.

For example, conditional logic may be used to define, which event states 12 of the apparatus 31 result in which target 4 or targets 4 being selected from the plurality of putative targets 4. A particular event 10 or combination of events 10 may be a necessary condition for selection of a particular target 4 but not a sufficient condition. Also a particular event 10 or combination of events 10 may be a necessary and sufficient condition for selection of a particular target 4.

Alternatively, a predictive model may be used by the controller 34 to map inputs (disambiguating data 8, putative targets) to an output (most likely intended target). Such a predictive model may be adaptive and develop when a user provides feedback on the results produced by the predictive model, for example, if the results are a list and the user selects an item in the list.

In some but not necessarily all examples, user preference information may be used as disambiguating data 8. The user preference information may be explicitly defined by a user or may be implicitly defined by a user's past choices. Thus if a user has a bias towards a certain target type then the influence of the disambiguating data 8 associated with the corresponding event class can be given greater influence. The bias of a user can be determined by storing statistical historical information concerning the user's selection of targets 4 or use of selected targets. The disambiguation can therefore be adaptive.

The disambiguating data 8 may be independent of the gesture user input 2. Although the disambiguating data may not be dependent upon the gesture itself, it may be dependent upon the timing of the gesture user input 2. In some but not necessarily all examples it may also be dependent on a position of the gesture.

Commands

The or each of the targets 4 is associated with a user input command 6. For example, the or each of the targets 4 may be associated with one user input command 6 or more than one user input command 6. The number of user input commands associated with a target may vary from target to target.

In some but not necessarily all examples, some or all targets may be associated with one or more common user input commands. Thus the same common user input command(s) is associated with more than one target.

In some but not necessarily all examples, some or all targets may be associated with different user input commands. Thus, in some examples, the same user input command may not be associated with more than one target.

In some but not necessarily all examples, the user input command 6 is an independent, sole command and not one of a series of inter-related commands.

The user input command should result in an intended outcome as a consequence of the user input gesture.

In some but not necessarily all examples, the user input command 6 may enable an external communication function. For example, the user input command may cause sharing of an object determined by the selected target 4 with other users or registering comments or indications in association with the object or any other suitable function.

The user input command 6 may depend on the target 4 and/or the user input command 6 may depend upon the gesture user input 2.

The association between the target 4 and the user input command 6 may be direct or indirect. Indirect association may, for example, occur when associated through one or more intermediaries to the user input command 6.

The user input command 6 may be performed on an object. The object may be the selected target or associated with the selected target.

For example, the user input command may comprise storing an object or an indication that the user likes an object or other information associated with the object. The stored object may be shared using a communications function at a later point in time. For example the user may store objects while they are wearing an apparatus 31 and then, at a later point, connect the apparatus 31 to a communications network or other apparatus 31 to enable the stored objects to be uploaded. The wearable device may not have full resident functionality, it could operate in combination with another apparatus. In some examples the objects may be stored in a memory 35 of the apparatus 31 and may be transferred from that memory 35 to another apparatus.

Direct Association

In some but not necessarily all examples the outcome performed in response to the user input command comprises performing directly on the selected target (an object) It may, for example, be an object of the user's attention.

Indirect Association (Real World)

In some examples the outcome performed in response to the user input command comprises performing directly on an object linked to by the selected target rather than the selected target.

The selected target may, for example, be an object of the user's attention.

In examples where the object of the user's attention is a real world object, an object associated with the real world target may be accessed, using for example computer vision, augmented reality or visual search technology, to enable an outcome to be performed using the accessed object.

For example, in some examples the apparatus 31 may be configured to capture an image of the real world object which may be stored as a digital image. The captured image may be stored in a memory 35 of the apparatus 31. The captured image may be used in a search. For example, the captured image may be transferred to another apparatus such as a mobile phone or remote server to enable one or more objects associated with the captured image to be identified and accessed or the captured image may be used to perform a visual search (e.g. using an application such as Google Goggles).

Examples of a real world object include a person, a newspaper, an advertisement, printed text, landmarks, artwork, consumer products, logos, packaging etc.

The search may find a plurality of objects. The object which a user is most likely to want to select may be identified based on factors such as the popularity of objects with other users, previous activity by the user (such as whether or not the user has selected similar objects before), the location of the user, information associated with the user such as appointments stored in a calendar application or information stored in a blog or social networking service or any other information.

Object Performed on

The object performed on may, for example, be an object as previously described with reference to FIG. 4. The object may be, for example, a captured image, a captured audio file, received search results, text, images, audio content.

The object performed on may be an electronic data structure which is configured to be stored in a memory. The memory may be local memory 35, which is local to the apparatus 31, or a remote memory from which data is retrievable by the apparatus 31.

Methods

FIG. 1 illustrates an example method 9.

The method 9 may be implemented using an apparatus 31 such as the apparatus 31 illustrated in FIG. 6 or 7 or as described in the preceding or following paragraphs.

At block 11 a gesture user input 2 is detected. The gesture user input 2 may comprise an action by the user which may be detected by an apparatus 31 and used to control the apparatus 31. Detection of a gesture user input 2 may be automatic.

The gesture user input 2 is ambiguous as to which one of a plurality of putative targets 4 the gesture user input 2 is directed because there are a plurality of targets 4 to which the gesture user input 2 is associated. Furthermore, it may not be uniquely defined by the gesture user input 2 itself which of the associated plurality of targets 4 is the intended target 4 to which the gesture user input 2 is directed.

The gesture user input 2 may be detected at a detector 45 and/or at a processor 33. For example, a gesture may be detected (parameterised) at the detector but the gesture may only be detected (recognised) as a user input by the processor 33 or other circuitry, for example in the detector 45.

Next, at block 13, the method 9 performs disambiguation of the plurality of putative targets 4 using disambiguating data 8. This disambiguation enables selection of one of the plurality of targets 4. The disambiguation may be automatic.

Next at block 15, a user input command 6 associated with the selected target 4 is performed. Performance of the associated, user input command 6 may be automatic or may be under user control.

In some examples the disambiguating data 8 may be obtained in response to the detection 11 of the gesture user input 2. In other examples the disambiguating data 8 may be obtained automatically before the gesture user input 2 is detected.

FIG. 2 illustrates an example of block 13 and the subblocks it may contain. Block 13 disambiguates the plurality of putative targets 4 using disambiguating data 8.

A gesture user input 2 may be intended for (directed to) one of many possible targets 4 (putative targets). Disambiguation removes or reduces the uncertainty to enable selection of one (or more) of the plurality of targets 4. Disambiguation may produce a short-list of putative targets 4 or a single putative target 4. The short-list may be ordered as to likelihood of intention such that the most likely target 4, for the user, is displayed, for example, first.

In this example, block 13 comprises block 14 followed by block 16.

At block 14, using the disambiguating data 8, a plurality of putative targets 4 to which the gesture user input 2 may be directed, is determined.

Examples of targets 4 have been described previously, for example, in relation to FIG. 4. The different targets 4 may be determined by monitoring the input/output interfaces associated with the targets such as the display output, audio output, image input, audio input, user input, location input and gaze input.

The disambiguating data 8 may define an event state 12 of the apparatus. An event state 12 of the apparatus has been previously described, for example, in relation to FIG. 5.

Next at block 16 one or more of the putative targets 4 is selected using the disambiguating data 8.

More weight may be given to events that are current (live) when the gesture user input 2 is performed.

More weight may be given to events that have changed status recently e.g. just finished, opened, closed, started, ended, selected.

More weight may be given to events that have not previously occurred.

More weight may be given to events that relate to the event class that is most frequently associated with selected targets, for this user.

The putative target 4 associated with the event with most weight may be automatically selected.

Those putative targets 4 associated with the events with most weight may be produced as a list, from which a user can select a target. The list may be ordered by weight. The user may navigate the list before making a selection. Navigation controls may be input using gesture user inputs, such as for example, moving the detected gesture user input 2. Navigation of the list may occur by for example using a gesture to remove entries on the list which automatically scrolls the list.

The choices made by the user may be stored as user preferences and used as disambiguating data 8 to adapt future disambiguation.

In some examples different user input commands 6 which may be performed on the targets 4 may also be identified.

If the intended target 4 is not present on the list of putative targets 4, an option may be provided to enable the user to define a user-specified target 4. This may create an association 3 between the user-specified target 4 and the gesture user input 2, as illustrated in FIG. 3. Such an association 3 may result in the future inclusion of the user-specified target 4 within the plurality of putative targets 4 when that gesture user input 2 is subsequently detected. The user may also be able to define events 10, which if included in the disambiguating data 8 disambiguates the plurality of targets 4 to enable selection of the user-specified target 4. The user may also be able to define an association 5 between the user-specified target 4 and a specified user input command 6 as illustrated in FIG. 3. Such an association 5 results in the future performance of the specified user input command 6 when the user-specified target 4 is selected by a user or selected automatically after disambiguation.

The list may be stored in a look up table or a hash table which may enable the targets 4 to be associated with the outcomes which are performed for each target. In some examples the hash table may also include a probability that the user would select a particular target and outcome. The probability that the user would select a particular target may be based on previous actions of the user of the apparatus 31.

As an example, a user is reading a newspaper and he like an article. He wants to 'like' the author of this article on his Facebook® page. He makes the 'like' gesture but the choice of the author is not presented in the list of putative targets 4. The user then defines and selects the author manually as a user-specified target 4 and defines that gaze information should be used for disambiguation. Next time, when the 'like' gesture is performed and the disambiguation data 8 includes gaze information, the list of putative targets 4 will contain the author of the article (or some reference to him).

The list of putative targets 4 for a gesture user input is therefore dynamic. It gets modified and personalized.

An event-target table may be created e.g.,

|  | Gaze | Listening | Interaction |
|---|---|---|---|
| Share author |  |  |  |
| Share Music |  |  |  |
| Share Article |  |  |  |

The table may include a probability that the user would select a particular target 4 for particular events 10. The probability that the user would select a particular target may be based on previous actions of the user of the apparatus 31.

Each time, a target 4 is selected, the frequency counts for the current events 10 are incremented by 1 for that target 4. The next time an event 10 occurs, the list of putative targets 4 will include at least the most frequent targets 4 previously selected for that event. The user can add new rows to the table by defining new user-specified targets 4.

User Control

In some but not necessarily all examples, the user is able to program the gesture user input 2. In one example, the user puts the apparatus 31 into a record mode and after an indication from the apparatus 31 performs the gesture. The apparatus 31 may store a record of the gesture. It is then able to detect that gesture at a subsequent time by pattern matching the subsequent gesture and the stored record of the gesture.

In some but not necessarily all examples, the user is able to define an association 3 between a user specified first target 4 and the gesture user input 2, as illustrated in FIG. 3. Such an association 3 results in the inclusion of the specified first target 4 within the plurality of putative targets when the gesture user input 2 is subsequently detected. The user may also be able to define first disambiguating data, which if included in the disambiguating data 8 disambiguates the plurality of targets 4 to enable selection of the user specified target 4.

In some but not necessarily all examples, the user is able to define an association 5 between a user-specified target 4 and a specified user input command 6 as illustrated in FIG. 3. Such an association 5 results in the performance of the specified user input command when the user-specified target is selected by a user or automatically after disambiguation.

Apparatus

FIG. 6 schematically illustrates an example apparatus 31. The apparatus 31 may be used to implement methods such as those illustrated in FIGS. 1 and 2, and as described above.

It is to be appreciated that only features referred to in the following description are illustrated in FIG. 6 and that the apparatus 31 may comprise additional features that are not illustrated or alternative features to those illustrated.

The apparatus 31 may be, for example, a camera, a mobile cellular telephone, a personal computer or any other apparatus 31 which enables gesture user input. The apparatus 31 may comprise multiple physical parts.

The illustrated apparatus 31 comprises: a controller 34 and a user interface 43 which includes a gesture detector 44.

The apparatus 31 may also comprise an image capturing device 47, a detector 45, and a transmitter and/or receiver 49.

In some examples, the apparatus 31 may comprise a single image capturing device 47 whereas in other examples the apparatus may comprise more than one image capturing device 47.

In some examples, the apparatus 31 may comprise a single detector 45 whereas in other examples the apparatus 31 may comprise more than one detector 45, which may all be of the same type or some or all of which may be of different types.

In some examples, the apparatus 31 may comprise a single transmitter and/or receiver 49 whereas in other examples the apparatus 31 may comprise more than one single transmitter and/or receiver 49.

Selection of one of the plurality of targets 4 may occur by selection of only one of the plurality of targets 4 or by selection of more than one of the plurality of targets 4.

The controller 34, image capturing device 47, detector(s) 45, transmitter and/or receiver 49 and user interface 43 may be operationally coupled. It is to be appreciated that any number or combination of intervening elements may be provided between the respective components of the apparatus 31 including no intervening elements.

The controller 34 is configured to, in response to the detected gesture user input 2, disambiguate the plurality of putative targets 4 using disambiguating data 8 to enable performance of a user input command 6 associated with a selected target that has been selected from the plurality of targets 4.

In the illustrated example the controller 34 comprises a processor 33 and a memory 35. The controller 34 provides means for controlling the apparatus 31. The controller 34 may be implemented using instructions that enable hardware functionality, for example, by using executable computer program instructions 41 in one or more general-purpose or special-purpose processors 33 that may be stored on a computer readable storage medium 53 (e.g. disk, memory etc) to be executed by such processors 33.

The processor 33 may be configured to receive inputs from the user interface 43, the image capturing device 47, the transmitter and/or receiver 49 and the detector(s) 45. The processor 33 may also be configured to provide output commands to the user interface 43, the image capturing device 47, the transmitter and/or receiver 49 and the detector(s) 45. The processor 33 may also be configured to write to and read from the memory 35.

The image capturing device 47 may comprise any means which may enable an image to be captured. The image capturing device 47 may comprise an optical arrangement and an image sensor (a camera). The image sensor may be configured to convert light incident on the image sensor into an electrical signal to enable an image to be produced. The image sensor may comprise, for example, a digital image sensor such as a charge-coupled-device (CCD) or a complementary metal-oxide-semiconductor (CMOS). The image data may be in the form of a still image or a video image. The optical arrangement may be configured to focus or deflect incident light from an object onto the image sensor.

In some examples the apparatus 31 may also comprise one or more detectors 45. The detectors 45 may comprise any means which may be configured to detect disambiguating data 8.

The user interface 43 may comprise any means which enables a user to interact with the apparatus 31. The user interface 43 may enable a user to make user inputs which may be used to control the apparatus 31. The user interface 43 may also comprise an output device which may enable outputs to be provided to a user of the apparatus 31.

The transmitter and/or receiver 49 may comprise any means which enables a communication link to be established between the apparatus 31 and any other suitable apparatus 31. The controller 34 may be configured to provide data to the transmitter and/or receiver 49 for transmission over the communication link. The controller 34 may also be configured to decode signals received by the transmitter and/or receiver 49 into information. The received information may be stored in the memory 35.

The memory 35 may be configured to store a computer program 39 comprising computer program instructions 41 that control the operation of the apparatus 31 when executed by the processor 33. The computer program instructions 41 provide the logic and routines that enable the apparatus 31 to perform the methods illustrated in FIGS. 1 and 2. The processor 33 by reading the memory 35 is able to load and execute the computer program 39.

The computer program instructions 41 may provide computer readable program means configured to control the apparatus 31. The program instructions 41 may provide, when executed by the processor 33: means for detecting a gesture user input, wherein the gesture user input is ambiguous as to which one of a plurality of putative targets the gesture user input is directed; means for disambiguating the plurality of putative targets using disambiguating data to enable selection of one of the plurality of targets; and means for performing, in response to the gesture user input, a user input command associated with the selected target.

The computer program 39 may arrive at the apparatus 31 via any suitable delivery mechanism 51. The delivery mechanism 51 may be, for example, a computer-readable storage medium, a computer program product 53, a memory device, a record medium such as a CD-ROM or DVD or an article of manufacture that tangibly embodies the computer program 39. The delivery mechanism may be a signal configured to reliably transfer the computer program 39. The apparatus 31 may propagate or transmit the computer program 39 as a computer data signal.

Although the memory 35 is illustrated as a single component it may be implemented as one or more separate components some or all of which may be integrated/removable and/or may provide permanent/semi-permanent/dynamic/cached storage.

Although the processor 33 is illustrated as a single component it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

All or part of the apparatus 31 may be configured to be worn by the user of the apparatus 31. For example the apparatus 31 may be wholly or partly comprised in a headset 50 as illustrated in FIG. 8. The headset 50 may be mounted on or at the head or face of the user. When the headset 50 is mounted, the user's head or face may support the weight or a portion of the weight of the apparatus 31. The headset 50 may, in some examples, be worn like a pair of spectacles.

The headset 50 may in some but not necessarily all examples comprise a head-mounted display. Such a headset 50 may displays data to a user as if the information were positioned in the real world observed by the user (augmented reality). This may be achieved for example by direct image projection into an eye or eyes of the user or by projection onto a transparent surface in front of the user.

In some examples, the headset 50 may also comprise forward facing cameras 52. These cameras 52 capture images which may be used as keys to address data that is then displayed to a user to augment reality. The data can therefore be accessed independently without reference to other previous data accesses.

In some examples of the disclosure all of the one or more detectors 45 may be contained within the headset 50. A gaze detector 45, which may comprise one or more cameras may be directed backwards towards the user's face in use.

In some examples one or more of the detectors 45 may be located remotely from the processor 33 but may be configured to transmit information to the processor 33. For example, the apparatus 31 may also comprise detectors 45 which may be mounted on other parts of the body of the user, such as their arms. These may be used to enable different types of information about the current state of the user to be detected.

FIG. 7 illustrates an apparatus 31 according to another example of the disclosure. The apparatus 31 illustrated in FIG. 7 may be a chip or a chip-set. The apparatus 31 comprises a processor 33 and a memory 35 operable as described above in relation to FIG. 3 and operable to perform the method of FIG. 1.

Applications

Reference will now be made to a number of different applications, in which the aforementioned methods and apparatus may be used.

The detectors 45 of the apparatus 31 may include a gaze detector configured to track the pupils of the eye of the user and provide this information as disambiguating data 8. The tracking of the pupils of the eyes may indicate the direction the user is looking in and whether or not they are reading an article or looking at a picture.

If the user is reading then the putative targets may comprise objects which the user may be reading.

If the user is reading a newspaper, then the putative targets may, for example as illustrated in FIG. 9, comprise: newspaper title (or section), newspaper page; a first newspaper article title, a first newspaper article author, a second newspaper article title, a second newspaper article author, an image.

When the gesture user input 2 is detected by the gesture detector as a gesture user input 2, the gesture user input 2 is ambiguous as to which one of a plurality of putative targets 4 the gesture user input 2 is directed.

The plurality of putative targets are disambiguated using disambiguating data 8 to enable selection of one of the plurality of targets 4. Then a user input command 6 associated with the selected target 4 is performed.

If the disambiguating data 8 indicates that the user is observing rather than reading, then the selected target 4 may, for example, be the image closest to the user's gaze. The user input command may result in sharing of the selected image.

If the disambiguating data 8 indicates that the user is reading rather than observing, then the results of disambiguation may be a list comprising the article closest to the user's gaze and the next closest article to the user's gaze. The user may select one of the listed articles, for example by navigating the list as previously described, as the selected target. The user input command may result in sharing of the selected article.

In some examples the article may be presented to the user before the user input command is performed in relation to the article. If the wrong article is presented the user may be able to reject the article via a user input. The user input may comprise, for example, a thumbs down gesture. If the article is rejected a different article, for example, the adjacent article in the newspaper, may be presented to the user instead to enable the user to confirm that the right article has been determined.

The above described example enables a user to easily share content such as articles from a real world object such as a newspaper or magazine with a single gesture user input. The user input may be simple and convenient for a user to make. The user need not even stop reading the article to make the gesture user input as they may be able to make the gesture input without moving their eyes. They also do not need to manually find a link or digital copy of the article for sharing as this may occur in response to an automated search.

Restaurant

In one example, the detectors 45 of the apparatus 31 are configured to provide location information as disambiguating data 8.

The location information may be used during disambiguation to infer a current activity of the user of the apparatus 31. For example, if the location is determined to be a restaurant then it may be inferred that the user is eating food or socialising. Further disambiguating data 8 may be required to disambiguate between these options.

As the user is in a restaurant then the putative targets may comprise objects which are appropriate to that setting. The putative targets 4 may, for example, comprise: the restaurant name; an image and ambient music.

In this example, when the gesture user input 2 is detected by the gesture detector 45 as a gesture user input 2, the gesture user input is ambiguous as to which one of a plurality of putative targets 4 the gesture user input 2 is directed.

The plurality of putative targets 4 are disambiguated using disambiguating data 8 to enable selection of one of the plurality of targets. Then a user input command 6 associated with the selected target is performed.

The disambiguating data 8 may comprise GPS location data (or other accurate location data that can identify a building), data from an audio detector 45 and data from a camera 47. The disambiguating data 8 may indicate the current (and recent) location events, audio input events and image input events (as well as other events which may, in this example, not have a significant influence on the results of disambiguation).

If the disambiguating data 8 indicates that the user has recently finished a meal, for example, from analysis of captured images, then the results of disambiguation may indicate that the user likes the restaurant and the performed user command 6 associated with the selected target 4 may cause the apparatus 31 to communicate remotely and indicate that the user likes the restaurant, for example, on a social networking web-site or a review web-site.

Alternatively or additionally, the results of disambiguation may indicate that the user likes the particular dish eaten at the restaurant and the performed user input command 6 associated with the selected target 4 may cause the apparatus to store information concerning the dish in the apparatus 31 or remotely for subsequent review. This information may, for example, be a digital copy of the restaurant menu downloaded automatically from the restaurant's web-site.

Alternatively or additionally, the results of disambiguation may indicate that the user likes the particular dish eaten at the restaurant and the performed user command associated with the selected target 4 may enable the user to select from a copy of the menu the dish he likes so that the apparatus 31 can store information identifying the dish, perhaps with comments, in the apparatus 31 or remotely for subsequent review. The menu may, for example, be a digital copy of the restaurant menu downloaded automatically from the restaurant's web-site and the items in the menu may be presented as a list of targets 4 for selection. In some examples the list of targets 4 may be filtered by referring to previous activity by a user, for example the user may have previously indicated that they prefer certain types of food or particular types of dishes and these may appear at the top of the list, whereas the user may have indicated that they do not like certain types of dishes or ingredients and dishes that match those conditions may be removed from the list or placed at the bottom of the list.

If the disambiguating data 8 indicates that the user is listening to music because for example there is ambient music and it is detected that the user has their eyes closed, then the results of disambiguation may indicate that the user likes the music and the performed user command 6 associated with the selected target 4 may cause the apparatus 31 to share the music or metadata associated with the music with a third party or to record it in, a user list for subsequent review.

If the disambiguating data 8 indicates that the user is observing people because for example analysis of a captured image indicates that the image includes faces or includes images of faces of contacts from an electronic address book on the apparatus 31, then the results of disambiguation may indicate that the user wishes to share the image and the performed user command 6 associated with the selected target 4 may be, for example, to upload the image to a social networking web-site.

In these preceding examples, the apparatus may have made the selection of the selected target automatically or the user may have been presented with one or more options for selection. Each option will relate to a different combination of target 4 and user command 6.

Television

In another example the detectors 45 of the apparatus 31 are configured to provide location information as disambiguating data 8. The location information may be used during disambiguation to infer a current activity of the user of the apparatus 31. For example, if the location is determined to be the user's home then it may be inferred that the user is likely to be reading or watching television etc. Further disambiguating data 8 may be required to disambiguate between these options.

In this example the detectors 45 of the apparatus 31 are configured to provide gaze information as additional disambiguating data 8.

The gaze information may be used during disambiguation to infer a current activity of the user of the apparatus 31.

For example, from the gaze information it may be inferred that the user is reading. The disambiguation of targets 4 is then the same or similar to that described above in relation to a newspaper.

For the purpose of this example, it is assumed that, from the gaze information it may be inferred that the user is watching television and is not reading.

Further disambiguating data 8 may be required to identify what the user is watching and to identify and disambiguate between putative targets 4.

For example, the user may be paying attention to the television programme or, for example, incidental music included in the television programme.

The putative targets 4 (and associated user input commands 6) in respect of the television programme may therefore include, for example:
record series of television programmes;
remind me when this program is repeated;
record that I like this television programme; and
tell me who the actor/writer/director is.

The putative targets 4 (and associated user commands) in respect of the music may therefore include, for example:
provide metadata concerning the music (title, artists, writer);
record that I like this music; and
buy this music track.

It may or may not be possible to further disambiguate between these putative targets 4 using additional disambiguating data 8.

User preference data may be used to disambiguate.

Other data may also be used to disambiguate, such as whether some of the putative targets are invalid because, for example, the series of the television programmes is already being recorded and so there is no need to record again, the whole of the program has been watched/recorded so it is unlikely that the user needs to be reminded of a repeat, the music track has already been bought so it is unlikely to be bought again. Other data may also be used to disambiguate. For example, if only a portion of the television programme has been watched and the whole of the program has not been recorded then it may be most likely that the user, wants to be reminded when the program is repeated.

In order to generate the above mentioned targets as possibilities, it may be possible to identify the television programme and/or identify the music. Identification of the television programme and/or music may be possible in a variety of ways—it may be possible for the apparatus 31 to interrogate the television/set-top box to obtain information, for example, from the electronic program guide, it may be possible to identify implanted visual or audio identifier codes within the broadcast images or sound, it may be possible to perform a visual search of captured images or an audio search of captured sound to identify the television programme and music respectively.

It may also be possible to obtain metadata concerning the television programme and/or track. This may for example be achieved by performing a directed internet search e.g. "[name of television programme] writer".

In order to perform the user commands 6 associated with the putative targets 4 it may be possible for the apparatus 31 to be able to program a recording device such as a set-top box, it may be possible to access a user's calendar whether stored on the apparatus 31 or remotely and set a reminder, it may be possible to access a web-site to record that the user likes' the television programme/music, it may be possible to access an on-line retailer to buy the music track.

Meeting

In further examples the detectors 45 of the apparatus 31 are configured to provide location information as disambiguating data 8.

The location information may be used during disambiguation to infer a current activity of the user of the apparatus 31. For example, if the location is determined to be an unknown location, then disambiguating data may be required to disambiguate between options.

For example, disambiguating data from a user's calendar may be used. In one example this may indicate that the user is in a meeting.

This information may be sufficient to disambiguate putative targets 4 and automatically select recording of audio input to the apparatus, in response to a gesture user input 2.

During the meeting the user may make a gesture user input 2. From the current disambiguating data 8 the apparatus 31 knows that the user is in a meeting and audio is being recorded. It may therefore be possible to disambiguate the putative targets 4 to determine that the most probable outcomes of selected user input commands are, in order, capture an image, flag this point in the recording or stop recording. The apparatus 31 may automatically perform one or more user input commands to achieve one or more of the outcomes. Alternatively the user may select between outcomes, using for example additional gestures.

It will be appreciated that many other examples may be described where different outcomes are achieved in response to the same gesture because of disambiguation of the outcomes using disambiguating data. The disambiguation may use contextual data to intelligently identify one or more than one, but in some examples not more than 10, outcomes from a much larger set of putative (potential) outcomes.

Examples of other outcomes are:
a) when a user is walking down a street and performs a gesture user input 2 (e.g. a 'like' gesture, such as a thumbs up gesture) while looking at an advertisement, then: a person in the advertisement may be identified using a visual search, and content may be provided to a user as a consequence (e.g. recent news stories or information such as when the person is next scheduled to be in a location close to the user);
b) when a user is watching a video of a product (e.g. cake) being made and performs a gesture user input 2 (e.g. a 'like' gesture) while looking at the video, then:
the user may be informed how to purchase a similar product (e.g. cake) either locally or on-line; or the user may be provided with manufacturing instructions for the product (e.g. a recipe for the cake).

It is to be appreciated that the methods and apparatus 31 described above could be used in any number of different situations.

General

In general, when a gesture is detected by the gesture detector 45 as a gesture user input 2, the gesture user input may be ambiguous as to which one of a plurality of putative targets 4 the gesture user input is directed. The plurality of putative targets 4 are disambiguated using disambiguating data 8 to enable selection of one of the plurality of targets 4. Then a user input command 6 associated with the selected target 4 is performed. The disambiguation may occur just before and/or during and/or just after the gesture user input 2.

Thus a single gesture user input 2 may have an outcome in one context that is significantly different to an outcome in a different context. The user can re-use the same gesture user input in different contexts to achieve different outcomes.

Initially each of the putative targets 4 may be assigned a pre-determined probability that the user would like to select them. Once the user has made a selection this may be used to update the respective probabilities that the user would select each of the putative targets in future situations. A higher probability may be given to targets similar to those that the user selected. These probabilities may be used as weights during disambiguation.

The blocks illustrated in FIGS. 1 and 2 may represent steps in a method and/or sections of code in a computer program 39. The illustration of a particular order to the blocks does not necessarily imply that there is a required or preferred order for the blocks and the order and arrangement of the blocks may be varied.

For example, the gesture user input may be detected before, during and/or after the disambiguating data 8 is obtained.

Furthermore, it may be possible for some blocks of the methods to be omitted.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

The term 'comprise' is used in this document with an inclusive not an exclusive meaning. That is any reference to X comprising Y indicates that X may comprise only one X or may comprise more than one X. If it is intended to use 'comprise' with an exclusive meaning then it will be made clear in the context by referring to "comprising only one . . . " or by using "consisting" to mean comprising in an exclusive meaning.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the disclosure believed to be of particular importance it should be understood that the applicant claims protection in respect of any patentable feature or combination of features hereinbefore referred to and/or shown in the drawings whether or not particular emphasis has been placed thereon.

We claim:

1. An apparatus comprising:
   a processor; and
   a memory including computer program code;
   wherein the memory and the computer program code are configured to, with the processor, enable the apparatus to:
   in response to a detected gesture user input, wherein the detected gesture user input is ambiguous as to which one of a plurality of putative targets the detected gesture user input is directed,
   disambiguate the plurality of putative targets using disambiguating data to enable performance of a user input command associated with a selected one of the plurality of putative targets;
   wherein the disambiguating data comprises data concerning current or recent attention of a user;
   wherein the disambiguating data enables timing of events associated with targets to be determined relative to a timing of the detected gesture user input;
   wherein the disambiguating data identifies activities of the apparatus;
   wherein the disambiguating data identifies one or more rendered objects;
   wherein the disambiguating data comprises data relating to an eye or eyes of the user;
   wherein the disambiguating data identifies one or more of: whether the eyes are open or closed; whether the eyes are attentive or non-attentive; whether the eyes are fixed or moving; whether the eyes are tracking;
   wherein the disambiguating data identifies whether the eyes are tracking back and forth; and
   wherein the disambiguating data comprises stored user preference information.

2. The apparatus as claimed in claim 1, wherein one, some or all of the plurality of putative targets comprise an object to which attention was given by recent user interaction, to which attention may have been given by recent proximity, and to which attention may have been drawn by a change in the status of the object.

3. The apparatus as claimed in claim 1, wherein one, some or all of the plurality of putative targets comprise objects rendered by the apparatus.

4. The apparatus as claimed in claim 1, wherein the disambiguating data is real-time data.

5. The apparatus as claimed in claim 1, wherein the user input command depends on the selected target and/or the detected gesture user input; wherein the user input command enables an external communications function.

6. The apparatus as claimed in claim 1, comprising one or more detectors for detecting motion of a user input object as the detected gesture user input.

7. The apparatus as claimed in claim 1, comprising or comprised in a headset.

8. The apparatus as claimed in claim 1 wherein the memory and the computer program code are configured to, with the processor, enable the apparatus to:
   display an ordered list wherein each entry in the list is associated with
   one of the plurality of putative targets, and wherein selection of an entry in the ordered list by the user selects the associated putative target and enables automatic performance of a user input command associated with the selected putative target.

9. The apparatus as claimed in claim 1 wherein the memory and the computer program code are configured to, with the processor, enable the apparatus to:
   enable navigation of the ordered list using additional detected gesture user inputs.

10. The apparatus as claimed in claim 1 wherein the memory and the computer program code are configured to, with the processor, enable the apparatus to:
    provide user programming of the detected gesture user input.

11. The apparatus as claimed in claim 1 wherein the memory and the computer program code are configured to, with the processor, enable the apparatus to:
    enable user definition of an association between a user specified first target and the detected gesture user input, such that detection of the detected gesture user input results in the inclusion of the user specified first target within the plurality of putative targets.

12. The apparatus as claimed in claim 1, wherein the memory and the computer program code are configured to, with the processor, enable the apparatus to:
    enable user definition of first disambiguating data, which if included in the disambiguating data disambiguates the plurality of putative targets to enable selection of the user specified target.

13. A non-transitory computer-readable software medium embodying a computer program comprising computer program instructions that, when executed by a processor, enable an apparatus at least to perform:

in response to a detected gesture user input, wherein the detected gesture user input is ambiguous as to which one of a plurality of putative targets the detected gesture user input is directed, disambiguating the plurality of putative targets using disambiguating data to enable selection of one of the plurality of putative targets to enable performance of a user input command associated with the selected putative target;

wherein the disambiguating data comprises data concerning current or recent attention of a user;

wherein the disambiguating data enables timing of events associated with targets to be determined relative to a timing of the detected gesture user input;

wherein the disambiguating data identifies activities of the apparatus;

wherein the disambiguating data identifies one or more rendered objects;

wherein the disambiguating data comprises data relating to an eye or eyes of the user;

wherein the disambiguating data identifies one or more of: whether the eyes are open or closed; whether the eyes are attentive or non-attentive; whether the eyes are fixed or moving; whether the eyes are tracking;

wherein the disambiguating data identifies whether the eyes are tracking back and forth; and wherein the disambiguating data comprises stored user preference information.

* * * * *